(12) United States Patent
Jung et al.

(10) Patent No.: US 8,937,917 B2
(45) Date of Patent: Jan. 20, 2015

(54) METHOD IN WHICH A TERMINAL ESTABLISHES COMPONENT CARRIERS IN A WIRELESS COMMUNICATION SYSTEM, AND APPARATUS FOR SAME

(75) Inventors: Sung Hoon Jung, Anyang-si (KR); Sung Duck Chun, Anyang-si (KR); Seung June Yi, Anyang-si (KR); Young Dae Lee, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 100 days.

(21) Appl. No.: 13/639,078

(22) PCT Filed: Apr. 4, 2011

(86) PCT No.: PCT/KR2011/002320
§ 371 (c)(1),
(2), (4) Date: Oct. 2, 2012

(87) PCT Pub. No.: WO2011/122920
PCT Pub. Date: Oct. 6, 2011

(65) Prior Publication Data
US 2013/0022015 A1  Jan. 24, 2013

Related U.S. Application Data

(60) Provisional application No. 61/320,721, filed on Apr. 3, 2010.

(51) Int. Cl.
*H04W 4/00* (2009.01)
*H04L 5/00* (2006.01)
(Continued)

(52) U.S. Cl.
CPC .............. *H04L 5/001* (2013.01); *H04L 5/0042* (2013.01); *H04W 72/02* (2013.01); *H04W 92/12* (2013.01); *H04W 72/0453* (2013.01)
USPC .......................................... 370/329; 455/450

(58) Field of Classification Search
None
See application file for complete search history.

(56) References Cited

U.S. PATENT DOCUMENTS 8,385,966 B2 *  2/2013  Lindholm et al. ............ 455/522
8,577,377 B2 * 11/2013  Shellhammer et al. ....... 455/444

(Continued)

FOREIGN PATENT DOCUMENTS

CN  102349342  2/2012
WO  2009/135848  11/2009

OTHER PUBLICATIONS

Luis G.U. Garcia et al., "Autonomous Component Carrier Selection: Interference Management in Local Area Environments for LTE-Advanced", IEEE Communications Magazine, Sep. 2009.

(Continued)

*Primary Examiner* — Ayaz Sheikh
*Assistant Examiner* — Faiyazkhan Ghafoerkhan
(74) *Attorney, Agent, or Firm* — Lee, Hong, Degerman, Kang & Waimey

(57) ABSTRACT

The present invention relates to a method in which a terminal establishes component carriers in a wireless communication system. More particularly, the method comprising the following steps: determining whether or not a second component carrier, which is associated with a first component carrier by means of system information, exists; if the second component carrier exists, establishing a relationship between the second component carrier and the first component carrier; and, if the second component carrier does not exist, establishing a relationship between a primary component carrier and the first component carrier.

5 Claims, 12 Drawing Sheets

(51) Int. Cl.
  *H04W 72/02* (2009.01)
  *H04W 92/12* (2009.01)
  *H04W 72/04* (2009.01)

(56) References Cited

U.S. PATENT DOCUMENTS

| | | | | |
|---|---|---|---|---|
| 8,711,709 | B2* | 4/2014 | Marinier et al. | 370/242 |
| 8,767,585 | B2* | 7/2014 | Pelletier et al. | 370/254 |
| 2001/0024956 | A1* | 9/2001 | You et al. | 455/455 |
| 2009/0175187 | A1* | 7/2009 | Jersenius et al. | 370/252 |
| 2009/0286566 | A1* | 11/2009 | Lindholm et al. | 455/522 |
| 2010/0091725 | A1* | 4/2010 | Ishii | 370/329 |
| 2010/0091726 | A1* | 4/2010 | Ishii et al. | 370/329 |
| 2010/0232382 | A1* | 9/2010 | Gauvreau et al. | 370/329 |
| 2010/0296467 | A1* | 11/2010 | Pelletier et al. | 370/329 |
| 2010/0303039 | A1* | 12/2010 | Zhang et al. | 370/331 |
| 2011/0014922 | A1* | 1/2011 | Jen | 455/450 |
| 2011/0021154 | A1* | 1/2011 | Marinier et al. | 455/67.11 |
| 2011/0039499 | A1* | 2/2011 | Zhang et al. | 455/67.11 |
| 2011/0045863 | A1* | 2/2011 | Lee et al. | 455/517 |
| 2011/0216686 | A1* | 9/2011 | Wu | 370/312 |
| 2011/0235565 | A1* | 9/2011 | Wu | 370/312 |
| 2012/0008600 | A1* | 1/2012 | Marinier et al. | 370/336 |

OTHER PUBLICATIONS

Alcatel-Lucent, "Component carrier indication for bandwidth extension in LTE-A", R1-093362, 3GPP TSG-RAN WG1 #58, Aug. 2009.

* cited by examiner (a) control-plane protocol stack (b) user-plane protocol stack previous CC connection configuration    corrected CC connection configuration previous CC connection configuration    corrected CC connection configuration previous CC connection configuration    corrected CC connection configuration previous CC connection configuration    corrected CC connection configuration previous CC connection configuration    corrected CC connection configuration

METHOD IN WHICH A TERMINAL ESTABLISHES COMPONENT CARRIERS IN A WIRELESS COMMUNICATION SYSTEM, AND APPARATUS FOR SAME

CROSS-REFERENCE TO RELATED APPLICATIONS

This application is the National Stage filing under 35 U.S.C. 371 of International Application No. PCT/KR2011/002320, filed on Apr. 4, 2011, which claims the benefit of U.S. Provisional Application Ser. No. 61/320,721, filed on Apr. 3, 2010, the contents of which are all hereby incorporated by reference herein in their entirety.

TECHNICAL FIELD

The present invention relates to a wireless communication system, and more particularly, to a method for establishing component carriers through a user equipment in a wireless communication system and an apparatus for the same.

BACKGROUND ART

A $3^{rd}$ generation partnership project long term evolution (3GPP LTE) (hereinafter, referred to as 'LTE') communication system which is an example of a mobile communication system to which the present invention can be applied will be described in brief.

FIG. 1 is a diagram illustrating a network structure of an Evolved Universal Mobile Telecommunications System (E-UMTS) which is an example of a mobile communication system. The E-UMTS is an evolved version of the conventional UMTS, and its basic standardization is in progress under the 3rd Generation Partnership Project (3GPP). The E-UMTS may also be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE) 120, base stations (eNode B and eNB) 110a and 110b, and an Access Gateway (AG) which is located at an end of a network (E-UTRAN) and connected to an external network. Generally, the base stations may simultaneously transmit multiple data streams for a broadcast service, a multicast service and/or a unicast service.

One or more cells may exist for one base station. One cell is set to one of bandwidths of 1.25, 2.5, 5, 10, and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic can be used between the base stations. An interface for transmitting user traffic or control traffic may be used between the base stations. A Core Network (CN) may include the AG and a network node or the like for user registration of the user equipment UE. The AG manages mobility of the user equipment UE on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure, open type interface, proper power consumption of the user equipment, etc. are required.

Recently, standardization of advanced technology of LTE is in progress under the 3rd Generation Partnership Project (3GPP). This technology will be referred to as "LTE-Advanced" or "LTE-A." One of important differences between the LTE system and the LTE-A system is difference in system bandwidth. The LTE-A system aims to support a wideband of maximum 100 MHz. To this end, the LTE-A system uses carrier aggregation or bandwidth aggregation that achieves a wideband using a plurality of frequency blocks. For wider frequency bandwidth, carrier aggregation aims to use a plurality of frequency blocks as one great logical frequency band. A bandwidth of each frequency block may be defined based on a bandwidth of a system block used in the LTE system. Each frequency block is transmitted using a component carrier.

DISCLOSURE

Technical Problem

Based on aforementioned discussion, an object of the present invention devised to solve the conventional problem is to provide a method for establishing component carriers through a user equipment in a wireless communication system and an apparatus for the same.

Technical Solution

In one aspect of the present invention, a method for configuring component carriers through a user equipment in a wireless communication system comprises the steps of determining whether or not a second component carrier, which is linked with a first component carrier by means of system information, exists; if the second component carrier exists, establishing a linkage between the second component carrier and the first component carrier; and if the second component carrier does not exist, establishing a linkage between a primary component carrier and the first component carrier.

In this case, if the first component carrier is an uplink component carrier, the second component carrier and the primary component carrier are downlink component carriers. Also, if the first component carrier is a downlink component carrier, the second component carrier and the primary component carrier are uplink component carriers.

Preferably, the first component carrier is the component carrier additionally configured in the user equipment, or the component carrier linked with a component carrier removed from the user equipment.

Meanwhile, according to the first embodiment of the present invention, the method may further comprise the steps of: receiving data from the base station through the second component carrier or the primary component carrier; and transmitting feedback data of the data to the base station through the first component carrier.

Also, according to the second embodiment of the present invention, the method may further comprise the steps of calculating path loss of the signal received from the base station through the second component carrier or the primary component carrier; and configuring power headroom reporting corresponding to the first component carrier on the basis of the path loss.

Also, according to the third embodiment of the present invention, the method may further comprise the step of receiving an uplink transmission timing offset value of the first component carrier from the base station through the second component carrier or the primary component carrier.

Finally, according to the fourth embodiment of the present invention, the method may further comprise the steps of transmitting a random access preamble to the base station through the first component carrier; and receiving a random access response from the base station through the second component carrier or the primary component carrier.

Advantageous Effects

According to the embodiments of the present invention, the user equipment may efficiently establish component carriers in a wireless communication system to which a carrier aggregation scheme is applied.

It will be appreciated by persons skilled in the art that that the effects that could be achieved with the present invention are not limited to what has been particularly described hereinabove and other advantages of the present invention will be more clearly understood from the following detailed description.

BEST MODE FOR CARRYING OUT THE INVENTION

Hereinafter, structures, operations, and other features of the present invention will be understood readily by the preferred embodiments of the present invention, examples of which are illustrated in the accompanying drawings. Embodiments described later are examples in which technical features of the present invention are applied to 3GPP system.

Hereinafter, a system that includes a system band of a single component carrier will be referred to as a legacy system or a narrowband system. By contrast, a system that includes a system band of a plurality of frequency blocks and uses at least one or more frequency blocks as a system block of a legacy system will be referred to as an evolved system or a wideband system. The frequency block used as a legacy system block has the same size as that of the system block of the legacy system. On the other hand, there is no limitation in sizes of the other frequency blocks. However, for system simplification, the sizes of the other frequency blocks may be determined based on the size of the system block of the legacy system. For example, the 3GPP LTE system and the 3GPP LTE-A system are evolved from the legacy system.

Based on the aforementioned definition, the 3GPP LTE system will herein be referred to as an LTE system or legacy system. Also, a user equipment that supports the LTE system will be referred to as an LTE user equipment or a legacy user equipment. The 3GPP LTE-A system will be referred to as an LTE-A system or an evolved system. Also, a user equipment that supports the LTE-A system will be referred to as an LTE-A user equipment or an evolved user equipment.

For convenience, although the embodiment of the present invention will be described based on the LTE system and the LTE-A system in this specification, the LTE system and the LTE-A system are only exemplary, and the embodiment of the present invention may be applied to all communication systems corresponding to the aforementioned definition. Also, although the embodiment of the present invention will be described based on an FDD mode in this specification, the FDD mode is only exemplary, and the embodiment of the present invention may easily be applied to an H-FDD mode or a TDD mode.

Figure 1:
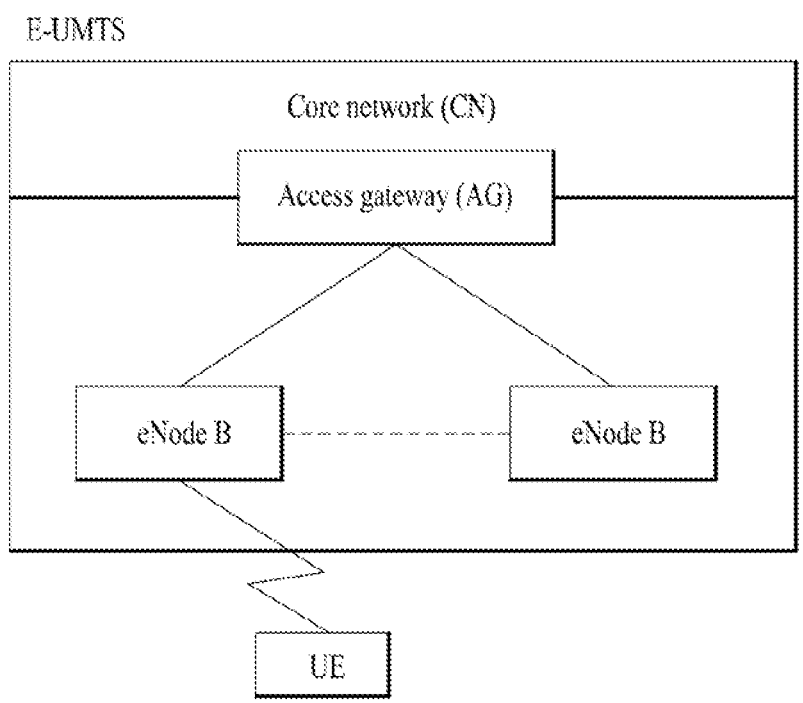
FIG. 1 is a diagram illustrating a network structure of an Evolved Universal Mobile Telecommunications System (E-UMTS), which is an example of a wireless communication system.
Figure 2:
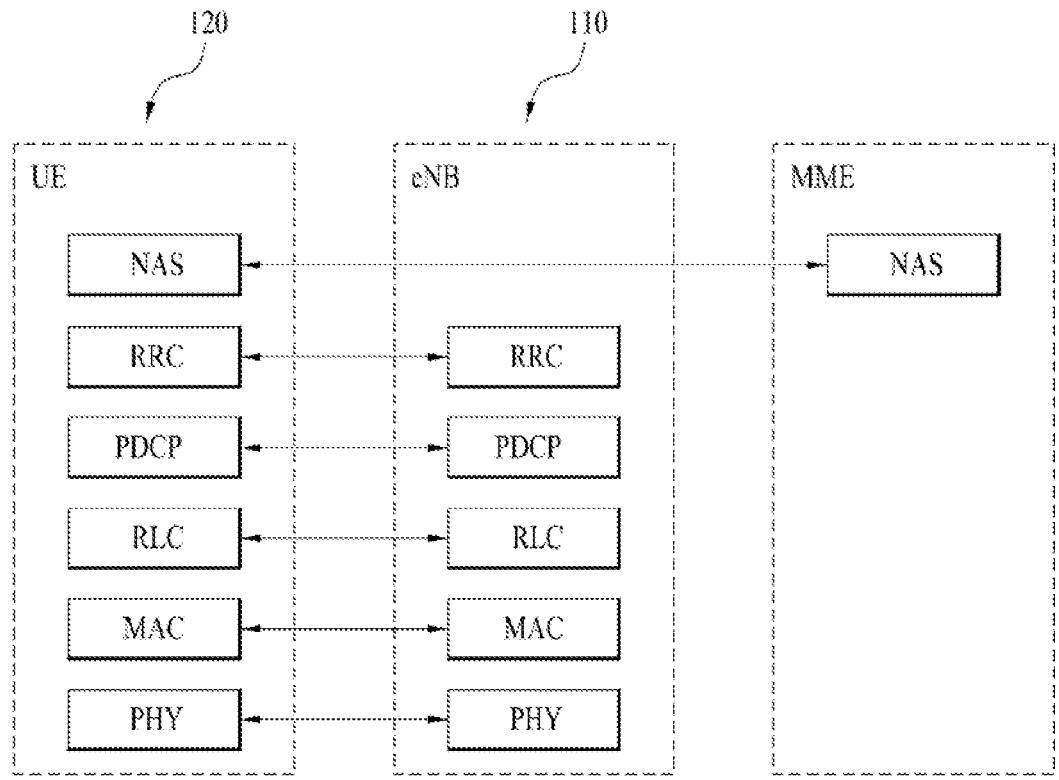
FIG. 2 is a diagram illustrating structures of a control plane and a user plane of a radio interface protocol between a user equipment and E-UTRAN based on the 3GPP radio access network standard.
Figure 2:
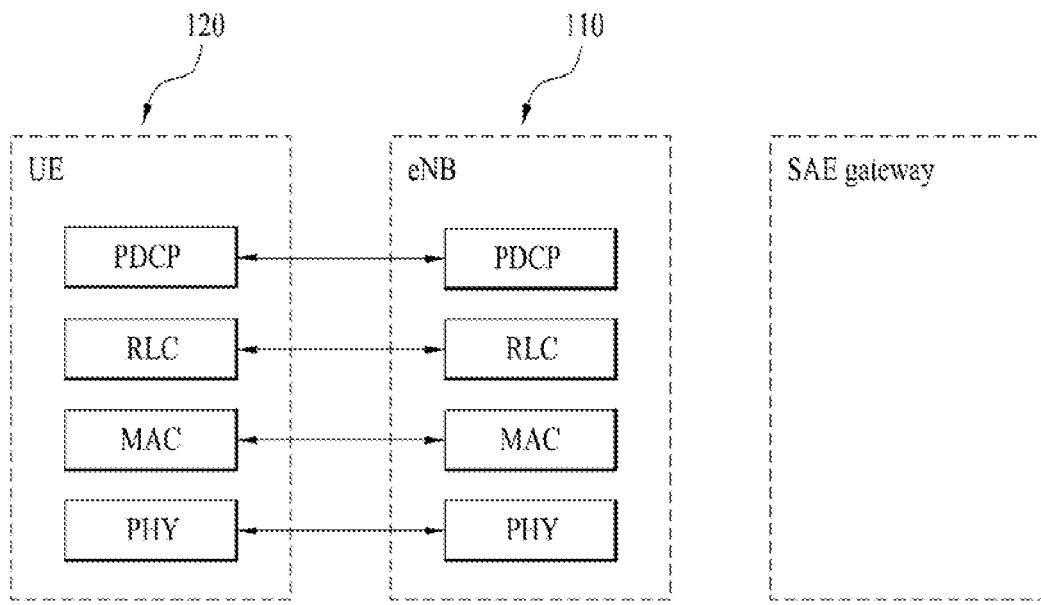

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer (PHY) is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control layer of the second layer provides a service to a radio link control (RLC) layer above the MAC layer via a logical channel. The RLC layer of the second layer supports reliable data transfer. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other.

One cell constituting a base station eNB is set to one of bandwidths of 1.25, 2.5, 5, 10, 15, and 20 Mhz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH).

Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
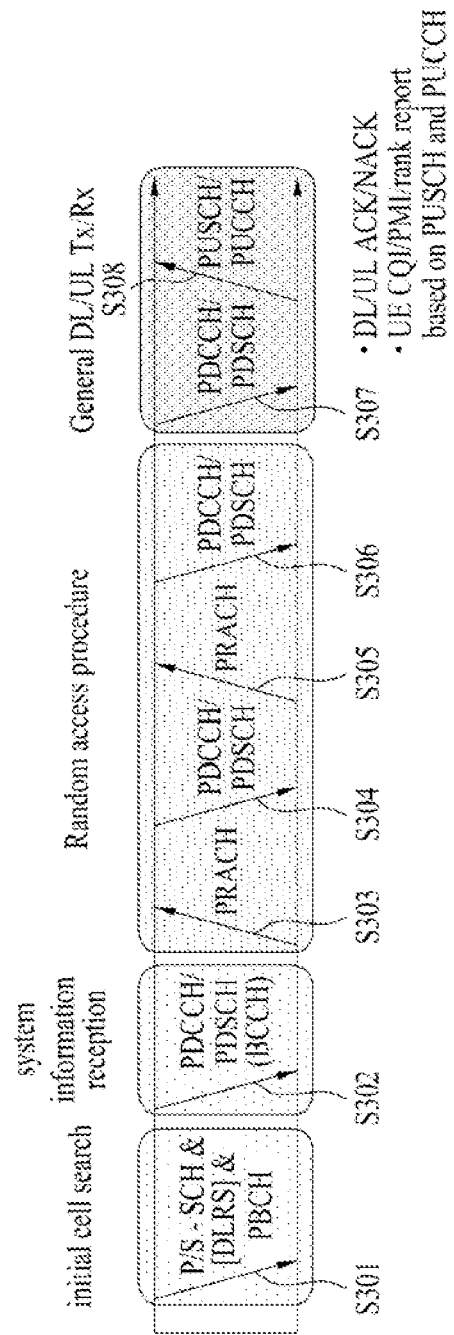
FIG. 3 is a diagram illustrating physical channels used in a 3GPP system and a general method for transmitting a signal using the physical channels.

FIG. 3 is a diagram illustrating physical channels used in a 3GPP system and a general method for transmitting a signal using the physical channels.

The user equipment performs initial cell search such as synchronizing with the base station when it newly enters a cell or the power is turned on (S301). To this end, the user equipment may synchronize with the base station by receiving a primary synchronization channel (P-SCH) and a secondary synchronization channel (S-SCH) from the base station, and may acquire information of cell ID, etc. Afterwards, the user equipment may acquire broadcast information within the cell by receiving a physical broadcast channel (PBCH) from the base station. In the mean time, the user equipment may identify the status of a downlink channel by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH (S302).

In the meantime, if the user equipment initially accesses the base station, or if there is no radio resource for signal transmission, the user equipment may perform a random access procedure (RACH) for the base station (S303 to S306). To this end, the user equipment may transmit a preamble of a specific sequence through a physical random access channel (PRACH) (S303 and S305), and may receive a response message to the preamble through the PDCCH and the PDSCH corresponding to the PDCCH (S304 and S306). In case of a contention based RACH, a contention resolution procedure may be performed additionally.

The user equipment which has performed the aforementioned steps may receive the PDCCH/PDSCH (S307) and transmit a physical uplink shared channel (PUSCH) and a physical uplink control channel (PUCCH) (S308), as a general procedure of transmitting uplink/downlink signals. In particular, the user equipment receives downlink control information (DCI) through the PDCCH. In this case, the DCI includes control information such as resource allocation information on the user equipment, and has different formats depending on its usage.

In the meantime, the control information transmitted from the user equipment to the base station or received from the base station to the user equipment through the uplink includes downlink/uplink ACK/NACK signals, a channel quality indicator (CQI), a precoding matrix index (PMI), a scheduling request (SR), and a rank indicator (RI). In case of the 3GPP LTE system, the user equipment may transmit the aforementioned control information such as CQI/PMI/RI through the PUSCH and/or the PUCCH.

Hereinafter, RRC state of the user equipment and RRC connection method will be described. The RRC state means whether the RRC layer of the user equipment is logically connected with the RRC layer of the E-UTRAN. If the RRC layer of the user equipment is logically connected with the RRC layer of the E-UTRAN, it may be referred to as RRC connected (RRC_CONNECTED) state. If not so, it may be referred to as RRC idle (RRC_IDLE) state.

Next, system information will be described. The system information includes essential information that should be known by the user equipment to access the base station. Accordingly, the user equipment should receive all kinds of the system information before accessing the base station, and should have the latest system information. Since the system information is the information that should be known by all the user equipments within one cell, the base station transmits the system information periodically.

The system information may be divided into a master information block (MIB), a scheduling block (SB), and a system information block (SIB). The MIB allows the user equipment to know physical configuration of the corresponding cell, for example, bandwidth information. The SB indicates transport information of the SIBs, for example, transmission period. The SIB is the aggregation of related system information. For example, specific SIB includes only information of peripheral cells, and another SIB includes only information of an uplink radio channel used by the user equipment.

Since the E-UTRAN may identify the presence of the user equipment which is in the RRC connected state, on the basis of cell unit, it may effectively control the user equipment. On the other hand, the E-UTRAN may not identify the user equipment which is in the RRC idle state, on the basis of cell unit. In this case, the user equipment is managed by the core network (CN) on the basis of TA unit which is a local unit greater than the cell unit. In other words, in order that the user equipment which is in the RRC idle state receives a service such as voice or data, the user equipment should be shifted to the RRC connected state.

In particular, when the user initially turns on the power of the user equipment, the user equipment searches for a proper cell and then is maintained in the RRC idle state in the corresponding cell. The user equipment maintained in the RRC idle state performs RRC connection establishment with the RRC layer of the E-UTRAN only if the RRC connection is required, and then is shifted to the RRC connected state. In this case, the case where the RRC connection is required may include a case where uplink data transmission is required due to calling attempt of the user or a case where a response message to a paging message transmitted from the E-UTRAN should be transmitted.

Figure 4:
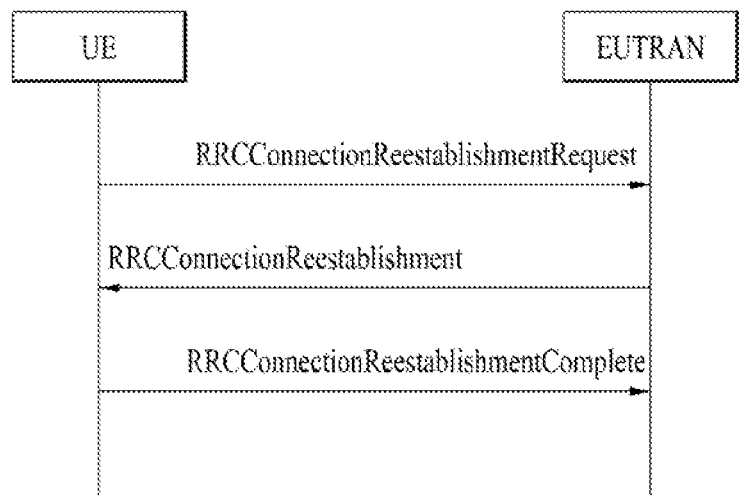
FIG. 4 is a diagram illustrating a procedure of establishing RRC connection in an LTE system.
Figure 5:
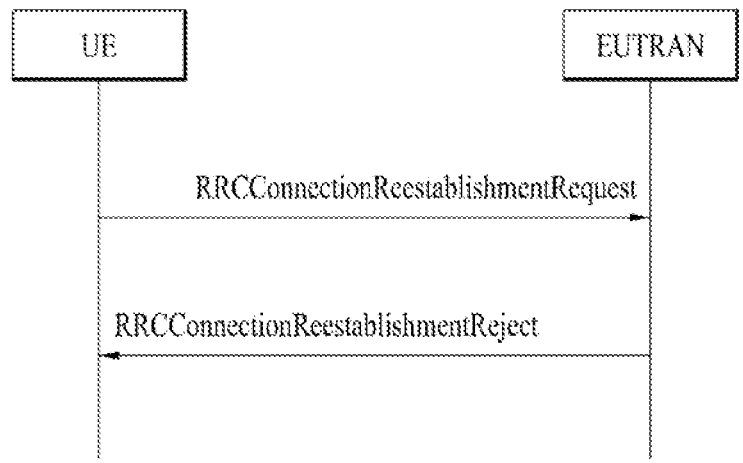
FIG. 5 is a diagram illustrating a procedure of re-establishing RRC connection in an LTE system.

FIG. 4 is a diagram illustrating a procedure of establishing RRC connection in an LTE system, and FIG. 5 is a diagram illustrating a procedure of re-establishing RRC connection in an LTE system.

Referring to FIG. 4 and FIG. 5, the user equipment which is in the RRC idle state receives common radio resource configuration parameters for RRC connection from the system information. For example, the user equipment receives common configuration parameters of various physical channels, common configuration parameters of a random access channel, and parameters of the other physical layers from a common radio resource configuration (RadioResourceConfigCommon) field of the system information, and attempts RRC connection with the base station on the basis of the received parameters.

The procedure of establishing RRC connection starts as the user equipment transmits RRC connection request (RRCConnectionRequest) message to the base station. If the base station accepts the RRC connection request message of the user equipment, it transmits RRC connection setup (RRCConnectionSetup) message, which includes signaling radio bearer 1 (SRB1) configuration information, to the user equipment. If the user equipment receives the RRC connection setup message from the base station, it configures SRB1 and then transmits RRC connection setup complete (RRCConnectionSetupComplete) message to the base station to identify success of RRC connection setup.

If RRC connection is successfully performed, the user equipment receives a setup parameter related to security from the network. If security setup is completed, the user equipment continues to perform a procedure of configuring signaling radio bearer 2 (SRB2) and data radio bearer (DRB) to configure various radio resources required to receive a service from the base station.

In the LTE system, the base station uses RRC connection re-establishment procedure to configure various radio resources of the user equipment. This procedure is used for re-establishment of RRC connection, such as configuration/ correction/removal of the RB. This procedure is also used to configure setup for measurement of the user equipment.

Next, a random access (RA) procedure provided in the LTE system will be described. The random access procedure provided in the LTE system may be classified into a contention based random access procedure and a non-contention based random access procedure. The contention based random access procedure and the non-contention based random access procedure may be determined depending on whether the user equipment has directly selected a random access preamble used during the random access procedure or the base station has selected the random access preamble.

In the non-contention based random access procedure, the user equipment uses a specific random access preamble directly allocated from the base station. Accordingly, if the base station allocates the specific random access preamble to the user equipment only, the random access preamble is used by the user equipment only, and the other user equipments do not use the random access preamble. Accordingly, since the relation of 1:1 is made between the random access preamble and the user equipment that uses the random access preamble, no contention occurs. In this case, since the base station may identify the user equipment that has transmitted the random access preamble as soon as it receives the random access preamble, it is efficient.

By contrast, in the contention based random access procedure, since the user equipment selects a random one of random access preambles, which may be used by the user equipment, and transmits the selected random access preamble, the possibility that a plurality of user equipments use the same random access preamble exists. Accordingly, even though the base station receives a specific random access preamble, it is impossible to identify what user equipment has transmitted the random access preamble.

Figure 6:
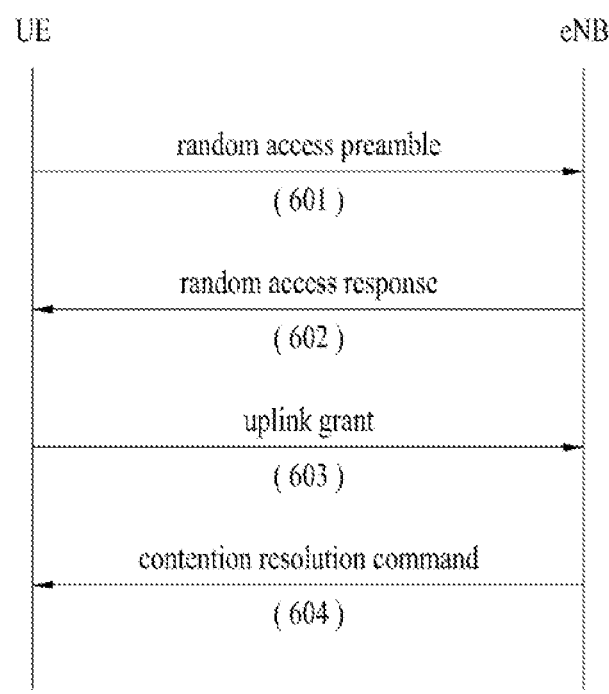
FIG. 6 is a diagram illustrating a procedure of an operation of a user equipment and a base station in a contention based random access procedure provided in an LTE system.

FIG. 6 is a diagram illustrating a procedure of an operation of a user equipment and a base station in a contention based random access procedure provided in an LTE system.

Referring to FIG. 6, in step 601, the user equipment randomly selects a random access preamble from a set of random access preambles indicated through system information or handover command, selects a PRACH resource, which may transmit the random access preamble, and transmits the selected PRACH resource. At this time, the preamble will be referred to as RACH MSG 1.

Also, after the user equipment transmits the random access preamble, in step 602, the base station attempts to receive its random access response within a random access response receiving window indicated through the system information or handover command. In more detail, RACH MSG 2, i.e., random access response information is transmitted in the form of MAC PDU, and the MAC PDU is transferred to the PDSCH. Also, in order that the user properly receives the information transferred to the PDSCH, the PDCCH is transferred together with the MAC PDU. In other words, the PDCCH includes information of the user equipment that should receive the PDSCH, frequency and time information of the radio resource of the PDSCH, and a transport format of the PDSCH. If the user equipment successfully receives the PDCCH, it properly receives the random access response transmitted to the PDSCH in accordance with the information of the PDCCH. The random access response includes random access preamble identity, uplink (UL) grant, temporary C-RNTI, and time alignment command. As random access response information for one or more user equipments may be included in one random access response, the random access preamble identity is required to indicate that the uplink grant, temporary C-RNTI and time alignment command are useful for what user equipment. The random access preamble identity is the same as the random access preamble selected by the user equipment in the step 601.

Subsequently, if the user equipment receives its useful random access response, in step 603, it processes all kinds of information included in the random access response, respectively. In other words, the user equipment applies the time alignment command and stores the temporary C-RNTI. Also, the user equipment transmits data stored in a buffer or newly generated data to the base station by using the uplink grant. At this time, the data transmitted through the uplink grant, i.e., MAC PDU will be referred to as RACH MSG 3. The data included in the uplink grant should essentially include the user equipment identity. This is because that it is required to identify the user equipments for contention resolution as the base station cannot determine what user equipments perform the random access procedure in the contention based random access procedure. Also, there are two methods of including the user equipment identity in the data included in the uplink grant. According to the first method, if the user equipment has a useful cell identity allocated from the corresponding cell before the random access procedure, it transmits its cell identity through the uplink grant. On the other hand, if the user equipment does not have a useful cell identity before the random access procedure, it transmits its cell identity together with its unique identity. Generally, the unique identity is longer than the cell identity. If the user equipment transmits data through the uplink grant, it initiates a contention resolution timer.

Finally, after the user equipment transmits data, which includes its identity, through the uplink grant included in the random access response, it waits for a command of the base station for contention resolution. In other words, the user equipment attempts to receive the PDCCH to receive a specific message. There are two methods of receiving the PDCCH. As described above, if the user equipment identity transmitted through the uplink grant is the cell identity, the user equipment attempts to receive the PDCCH by using the cell identity. If the user equipment identity is the unique identity, the user equipment attempts to receive the PDCCH by using the temporary C-RNTI included in the random access response. Afterwards, in case of the former case, if the user equipment receives the PDCCH (i.e., RACH MSG 4) through its cell identity before the contention resolution timer expires, the user equipment determines that the random access procedure has been performed normally and ends the random access procedure. In case of the latter case, if the user equipment receives the temporary C-RNTI before the contention resolution timer expires, it identifies data transferred from the PDSCH indicated by the PDCCH. If the unique identity of the user equipment is included in the data, the user equipment determines that the random access procedure has been performed normally and ends the random access procedure.

The user equipment performs the random access procedure in case of the following cases: 1) if the user equipment performs initial access due to no RRC connection with the base station; 2) if the user equipment initially accesses a target cell during a handover procedure; 3) if the random access procedure is requested by a command of the base station; 4) uplink data occur in a state that time synchronization of the uplink is not performed or a designated radio resource is not allocated; and 5) if a recovery procedure is performed due to radio link failure or handover failure.

Figure 7:
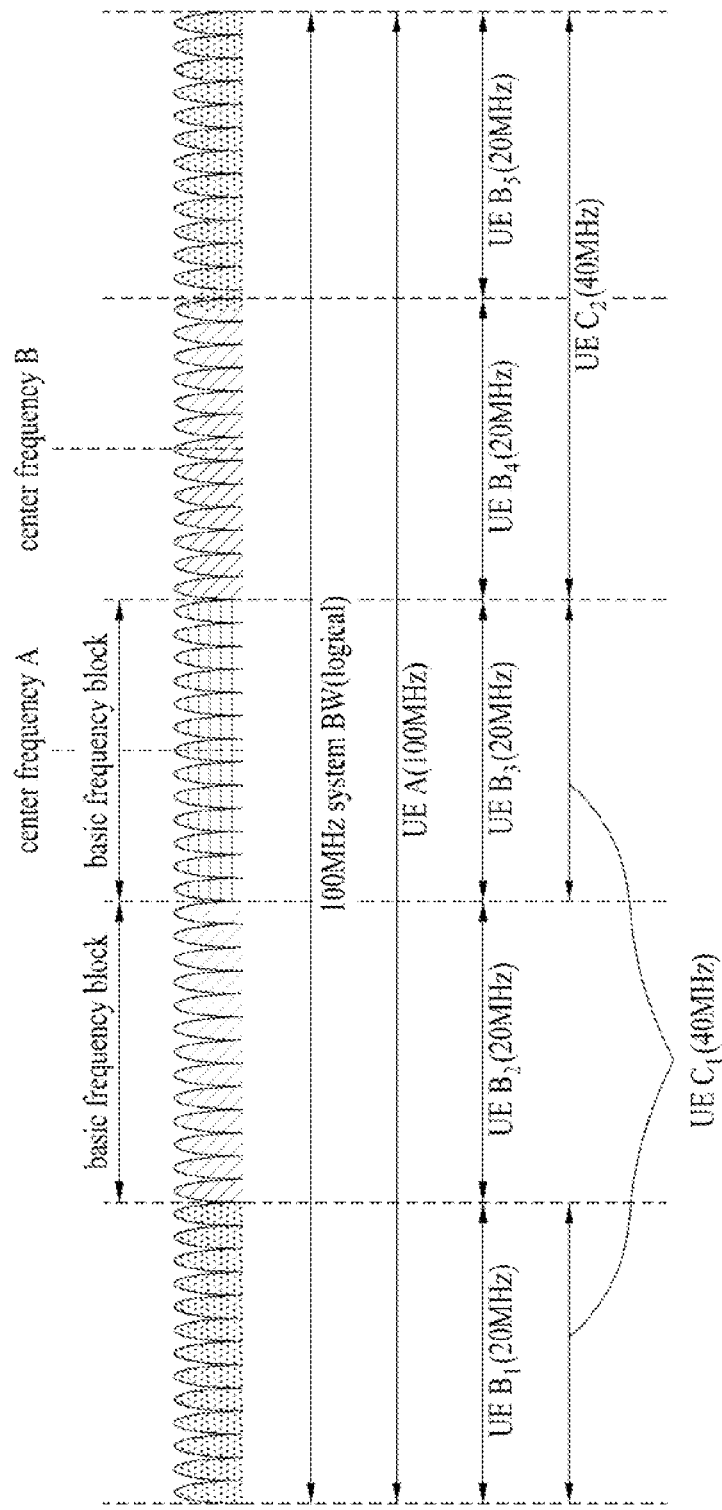
FIG. 7 is a conceptional diagram illustrating a carrier aggregation scheme.

FIG. 7 is a conceptional diagram illustrating a carrier aggregation scheme. The carrier aggregation means that the user equipment uses a plurality of frequency blocks or (logical) cells, which include uplink resources (or component carriers) and/or downlink resources (or component carriers), as one large logical frequency band to enable a wireless communication system to use a wider frequency band. Hereinafter, for convenience of description, the carrier aggregation will be referred to as component carriers.

Referring to FIG. 7, a whole system bandwidth (system BW) is a logical band and has a bandwidth of 100 MHz. The whole system bandwidth includes five component carriers, each of which has a bandwidth of maximum 20 MHz. The component carrier includes at least one or more physically continuous subcarriers. Although the respective component carriers have the same bandwidth in FIG. 7, it is only exemplary, and the component carriers may have their respective bandwidths different from one another. Also, although the respective component carriers adjoin each other in the frequency domain as shown, the drawing just represents the logical concept. The respective component carriers may logically adjoin each other, or may be spaced apart from each other.

A center frequency may be used differently for each of the component carriers. Alternatively, one center carrier common for physically adjoining component carriers may be used. For example, assuming that all component carriers are physically adjacent to one another in FIG. 7, a center carrier 'A' may be used. Assuming a case that the respective component carriers are not physically adjacent to each other, a center carrier 'A' for one component carrier, a center carrier 'B' for another component carrier, and the like may be used.

In this specification, a component carrier may correspond to a system bandwidth of a legacy system. By defining a component carrier based on a legacy system, it is possible to facilitate provision of backward compatibility and system design in a wireless communication environment in which an evolved user equipment and a legacy user equipment coexist. For example, in case that the LTE-A system supports carrier aggregation, each component carrier may correspond to a system bandwidth of the LTE system. In this case, the component carrier may have a bandwidth selected from the group including 1.25 MHz, 2.5 MHz, 5 MHz, 10 MHz and 20 MHz.

In case that a whole system band is extended by carrier aggregation, a frequency band used for communication with each user equipment is defined by a component carrier unit. A user equipment A may use a whole system bandwidth of 100 MHz and performs communication using five component carriers all. User equipments $B_1$ to $B_5$ may use a bandwidth of 20 MHz only, and each of the user equipments $B_1$ to $B_5$ performs communication using one component carrier. User equipment $C_1$ and user equipment $C_2$ may use a bandwidth of 40 MHz. Each of the user equipment $C_1$ and the user equipment $C_2$ performs communication using two component carriers. In this case, these two component carriers may be logically/physically adjacent to each other or may not. The user equipment $C_1$ represents a case of using two component carriers that are not adjacent to each other. And, the user equipment $C_2$ represents a case that two adjacent component carriers are used.

In the meantime, in order that the user equipment uses component carriers, the user equipment should receive configuration information of the component carriers from the base station. The configuration information of the component carriers may include at least a part of the system information of the component carriers and/or a parameter value related to an operation of each component carrier. If the user equipment receives the configuration information of the component carriers, it may transmit and receive data through each component carrier.

As described above, a plurality of component carriers may be configured in the LTE-A system. Moreover, correction, such as modification of the existing component carriers, addition of new component carriers, and removal of the existing component carriers, may be made in the existing configuration of the plurality of component carriers. This correction may be performed through the RRC connection re-establishment procedure. For example, in order to transmit a new component carrier to the user equipment, the network may transmit the RRC connection re-establishment message, which includes configuration information of a plurality of component carriers required for operation of a component carrier to be added, to the user equipment, and may additionally configure a new component carrier through the received component carrier configuration information.

At this time, unlike the case where one downlink component carrier and one uplink component carrier are configured in the user equipment, if a plurality of downlink component carriers and/or a plurality of uplink component carriers are configured and configuration information of the plurality of downlink/uplink component carriers is modified, or the existing component carriers are removed or new component carriers are added, a problem due to linkage between the respective component carriers may occur. This will be described with reference to FIG. 8.

FIG. 8 is a diagram illustrating linkage between a plurality of component carriers in a carrier aggregation scheme and an example of downlink component carriers which are additionally provided.

Figure 8A:
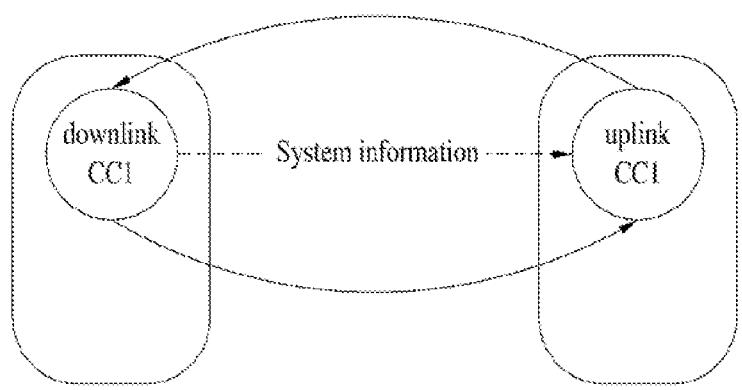
FIG. 8 is a diagram illustrating linkage between a plurality of component carriers in a carrier aggregation scheme and an example of downlink component carriers which are additionally provided.

In case of FIG. 8a, since a single downlink component carrier and a single uplink component carrier are established for the user equipment, one linkage exists between the uplink and the downlink. Generally, if the user equipment receives system information of the downlink of the component carrier, it may identify information (for example, uplink frequency information) of the uplink connected with the above downlink.

The linkage in FIG. 8a may be regarded as the linkage based on the system information. Hereinafter, if the linkage between the uplink and the downlink is based on the system information, for convenience of description, it will be denoted by a dotted line in the drawing related to the embodiment of the present invention.

Figure 8B:
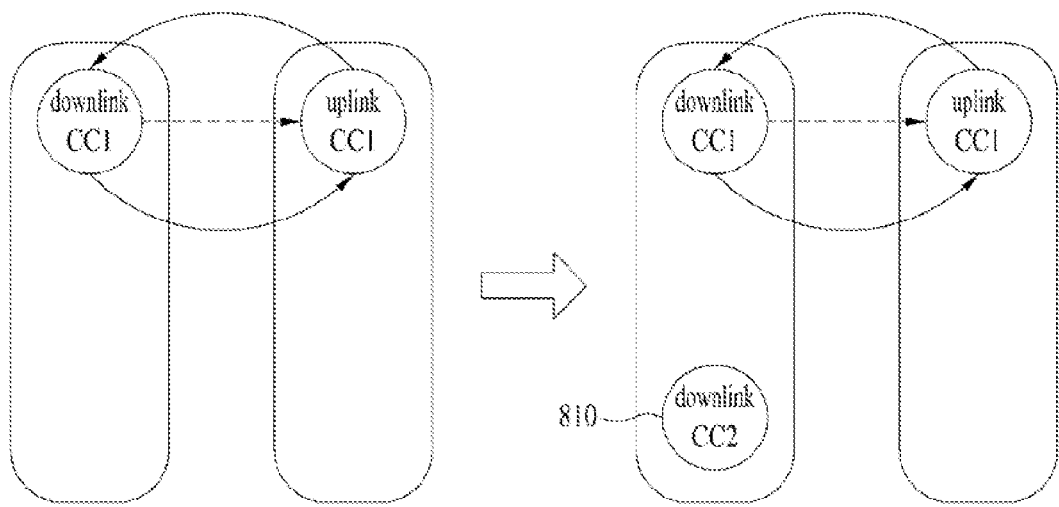

Unlike FIG. 8a, one downlink component carrier 810 has been added in FIG. 8b. In this way, if a plurality of uplink component carriers or a plurality of downlink component carriers are configured in the user equipment, the linkage between the uplink component carriers and the downlink component carriers may be unclear. For example, if the linkage between the added downlink component carrier 810 and the uplink component carrier is not clear, a problem occurs in that it is difficult to determine an uplink component carrier through which feedback information on data received through the added downlink component carrier 810 is transmitted to the base station.

Also, even if the previously configured downlink component carrier is removed, a problem may occur in a data communication method through the uplink component carrier constituting the linkage with the removed downlink component carrier. Although the component carrier may be removed by the base station, it may be removed by the user equipment.

For example, if the user equipment performs a procedure such as radio link monitoring to test whether there is a problem in RRC connection through a specific component carrier and determines that there is a problem in current RRC connection, it declares radio link failure (RLF) and releases RRC connection. In this case, the user equipment attempts recovery of RRC connection by performing RRC-reestablishment procedure. If the user equipment performs radio link monitoring per component carrier in an environment to which the carrier aggregation scheme is applied, it determines whether radio link failure occurs in each component carrier. Also, the user equipment may determine whether the component carrier with radio link failure corresponds to the uplink or the downlink. As a result, release of RRC connection may mean removal of the specific component carrier.

Accordingly, if the linkage between the uplink component carrier and the downlink component carrier becomes unclear when the downlink component carrier and/or the uplink component carrier is added or removed in the wireless communication system to which the carrier aggregation scheme is applied, the present invention suggests that the user equipment autonomously establishes the linkage.

Figure 9:
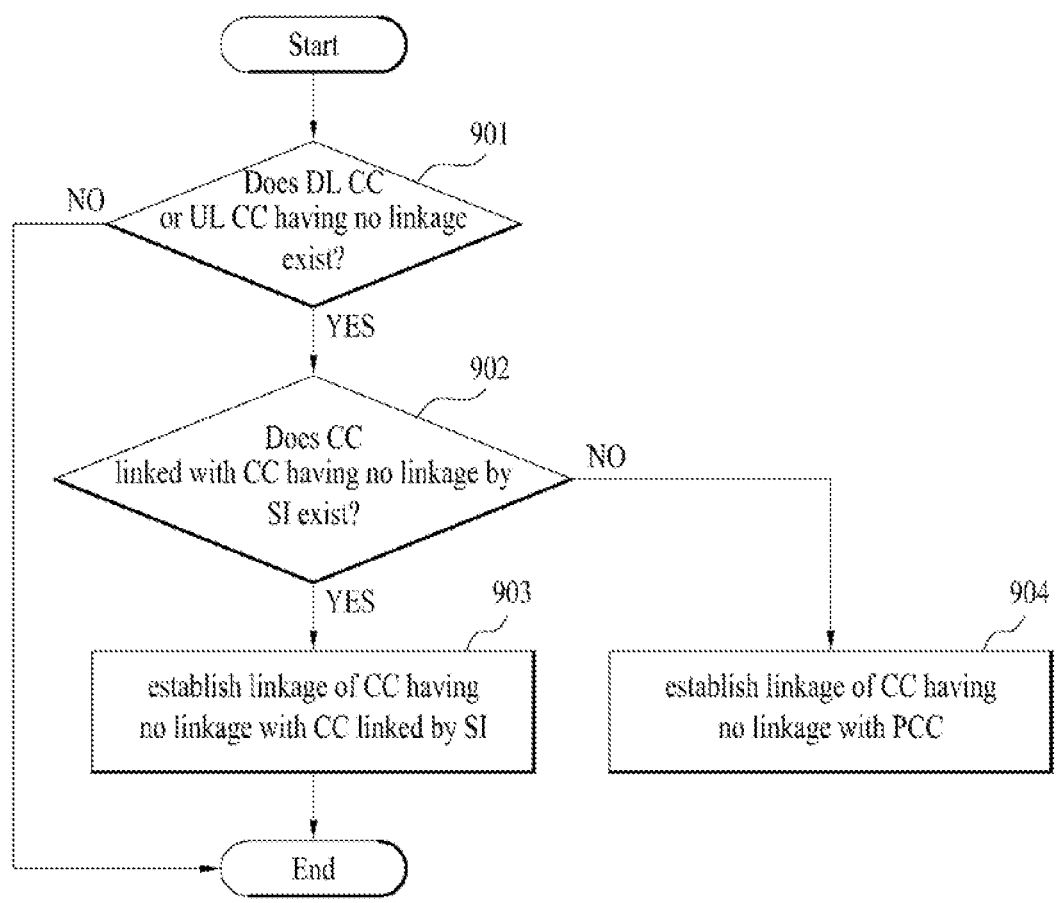
FIG. 9 is a flow chart illustrating a method for establishing linkage between component carriers in a user equipment in accordance with the embodiment of the present invention.

FIG. 9 is a flow chart illustrating a method for establishing linkage among component carriers in a user equipment in accordance with the embodiment of the present invention.

Referring to FIG. 9, in step 901, the user equipment identifies whether the downlink component carrier (or uplink component carrier) having unclear linage, that is, having no linkage exists due to addition or removal of the component carrier. If the downlink component carrier (or uplink component carrier) having no linkage exists, in step 902, the user equipment identifies whether the uplink component carrier (or downlink component carrier) linked with the component carrier having no linkage by system information (SI-Linked), that is having the linkage by SIB2 exists.

If the uplink component carrier (or downlink component carrier) linked with the downlink component carrier (or uplink component carrier) having no linkage by system information exists, in step 903, the user equipment establishes the linkage of the downlink component carrier (or uplink component carrier) having no linkage with the uplink component carrier (or downlink component carrier) linked by the system information.

Also, if the uplink component carrier (or downlink component carrier) linked with the downlink component carrier (or uplink component carrier) having no linkage by system information does not exist, since a primary component carrier (PCC) always exists in the user equipment, the user equipment establishes the linkage of the downlink component carrier (or uplink component carrier) having no linkage with a primary uplink component carrier (or downlink component carrier) in step 904.

Although the user equipment autonomously establishes the linkage of the component carrier in FIG. 9, the base station may establish the linkage and signal the establish linkage to the user equipment.

Hereinafter, if the downlink component carrier is added or removed and if the uplink component carrier is added or removed, a method for establishing a linkage of the component carrier in the user equipment will be described in more detail with reference to the drawings. In the following drawings, it is assumed that the primary downlink component carrier is the downlink component carrier 1 and the primary uplink component carrier is the uplink component carrier 1.

Figure 10:
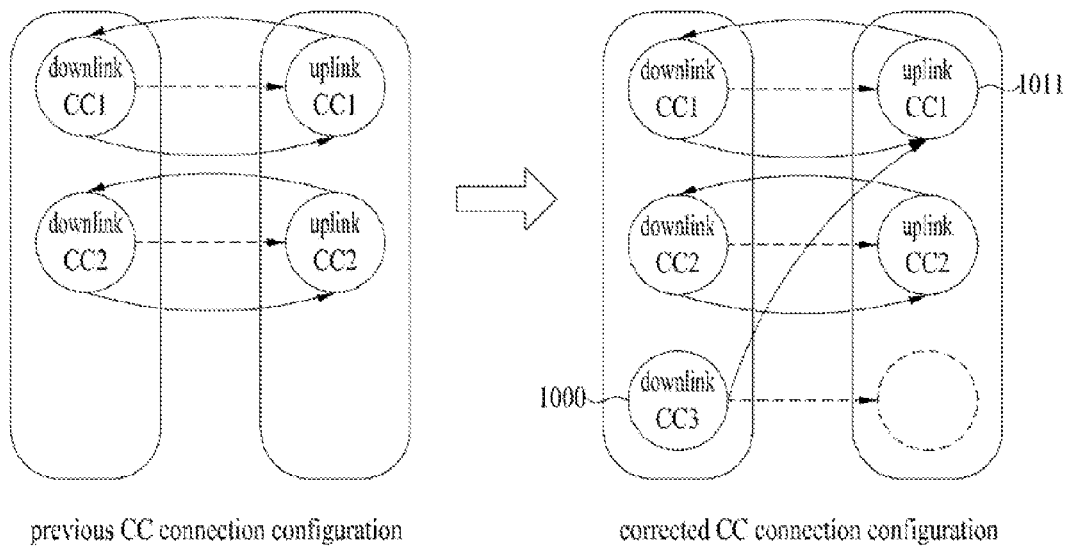
FIG. 10 is a diagram illustrating an example that a downlink component carrier is added and new linkage is established in accordance with the embodiment of the present invention.

FIG. 10 is a diagram illustrating an example that a downlink component carrier is added and new linkage is established in accordance with the embodiment of the present invention.

Referring to FIG. 10, it is noted that a downlink component carrier 3 1000 is added. If information on a linkage with the uplink component carrier is not included in a message adding the downlink component carrier 3 1000, the user equipment determines that the uplink component carrier having the linkage does not exist in the downlink component carrier 3 1000.

Under the circumstances, the user equipment selects one of uplink component carriers which are previously configured autonomously, and establishes the linkage between the selected uplink component carrier and the added downlink component carrier.

In other words, according to the present invention, the user equipment determines that the uplink component carrier linked with the added downlink component carrier 3 1000 by the system information (SI) exists. In FIG. 10, since the uplink component carrier linked with the added downlink component carrier 3 1000 by the system information (SI) does not exist, the user equipment establishes a linkage of the added downlink component carrier with an uplink component carrier 1 1010 which is a primary uplink component carrier.

Figure 11:
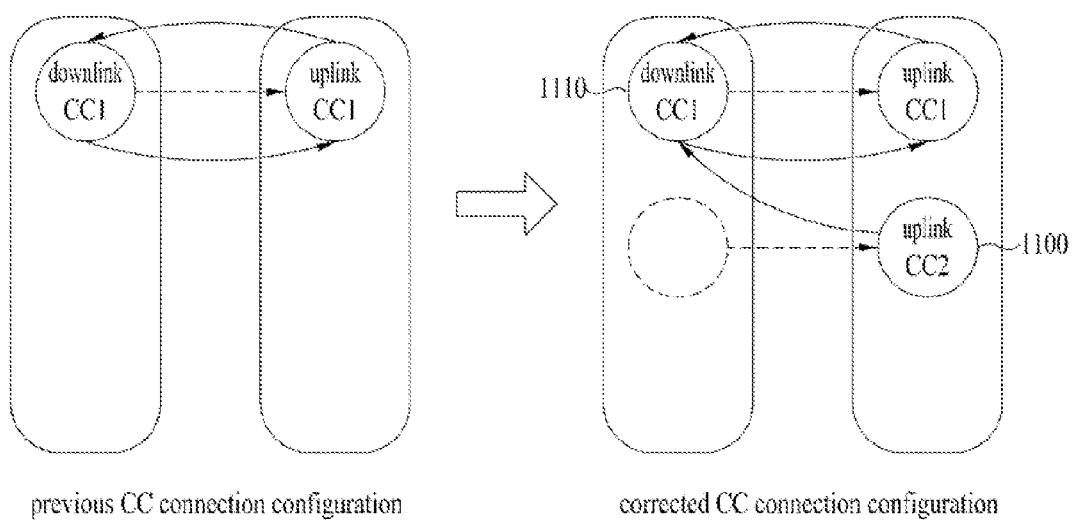
FIG. 11 is a diagram illustrating an example that an uplink component carrier is added and new linkage is established in accordance with the embodiment of the present invention.

FIG. 11 is a diagram illustrating an example that an uplink component carrier is added and new linkage is established in accordance with the embodiment of the present invention.

Referring to FIG. 11, it is noted that an uplink component carrier 2 1100 is added. If information on a linkage with the downlink component carrier is not included in a message adding the uplink component carrier 2 1100, the user equipment determines that the downlink component carrier having the linkage does not exist in the uplink component carrier 2 1100.

Under the circumstances, the user equipment selects one of downlink component carriers which are configured autonomously, and establishes the linkage between the selected downlink component carrier and the added uplink component carrier.

In other words, according to the present invention, the user equipment determines that the downlink component carrier linked with the added uplink component carrier 2 1100 by the system information (SI) exists. In FIG. 11, since the downlink component carrier linked with the added uplink component carrier 2 1100 by the system information (SI) does not exist, the user equipment establishes a linkage of the added uplink component carrier 2 1100 with a downlink component carrier 1 1110 which is a primary downlink component carrier.

Figure 12:
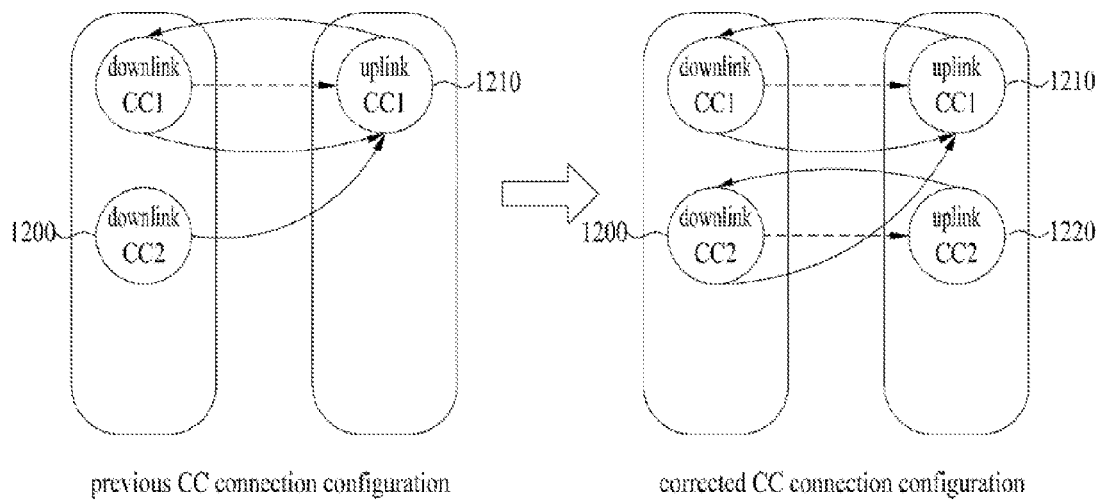
FIG. 12 is a diagram illustrating an example that an uplink component carrier is added and linkage between the uplink component carrier and the existing downlink component carrier is established in accordance with the embodiment of the present invention.

FIG. 12 is a diagram illustrating an example that an uplink component carrier is added and linkage between the uplink component carrier and the existing downlink component carrier is established in accordance with the embodiment of the present invention.

Particularly, in FIG. 12, it is assumed that a linkage of a downlink component carrier 2 1200 with an uplink component carrier 1 1210 which is a primary uplink component carrier is established. In this case, if information on a linkage with the downlink component carrier is not included in a message adding the uplink component carrier 2 1220, the user equipment first determines that the downlink component carrier linked with the added uplink component carrier 2 1220 by the system information (SI) exists.

In FIG. 12, since the downlink component carrier linked with the added uplink component carrier 2 1220 by the system information (SI) is the downlink component carrier 2 1200, the user equipment establishes the linkage of the added uplink component carrier 2 1220 with the downlink component carrier 2 1200. In this case, it is noted that the linkage of the added uplink component carrier 2 1220 with the downlink component carrier 2 1200 may be added in a state that the linkage between the downlink component carrier 2 1200 and the uplink component carrier 1 1210 is maintained.

Figure 13:
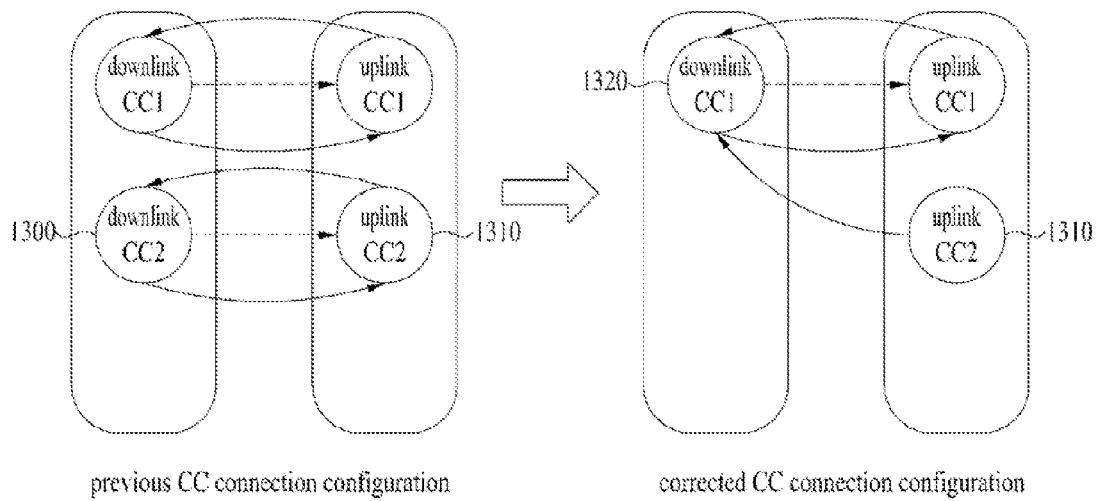
FIG. 13 is a diagram illustrating an example that the existing downlink component carrier is removed and new linkage is established in accordance with the embodiment of the present invention.

FIG. 13 is a diagram illustrating an example that the existing downlink component carrier is removed and new linkage is established in accordance with the embodiment of the present invention.

Referring to FIG. 13, it is noted that a downlink component carrier 2 1300 is removed. If the uplink component carrier linked with the removed downlink component carrier 2 1300 exists, the user equipment selects one of downlink component carriers which are configured autonomously and establishes a linkage with the uplink component carrier having the linkage with the downlink component carrier 2 1300.

In other words, the user equipment determines whether the downlink component carrier linked with an uplink component carrier 2 1310 by the system information (SI) exists, wherein the uplink component carrier 2 1310 is linked with the downlink component carrier 2 1300. In FIG. 13, since the downlink component carrier linked with the uplink component carrier 2 1310 by the system information (SI) does not exist, the user equipment establishes a linkage of the uplink component carrier 2 1310 with a downlink component carrier 1 1320 which is a primary downlink component carrier.

Figure 14:
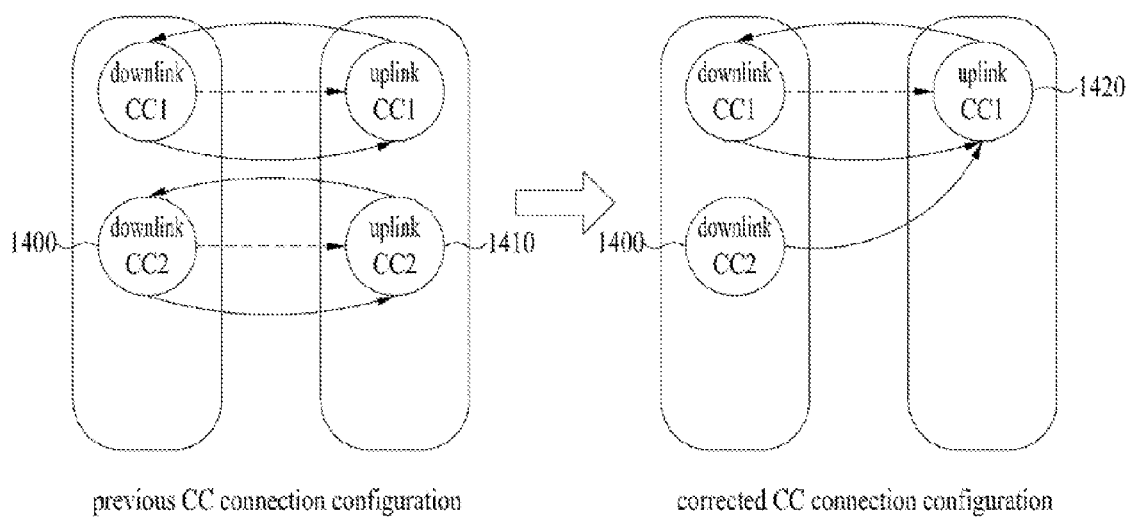
FIG. 14 is a diagram illustrating an example that the existing uplink component carrier is removed and new linkage is established in accordance with the embodiment of the present invention.

FIG. 14 is a diagram illustrating an example that the existing uplink component carrier is removed and new linkage is established in accordance with the embodiment of the present invention.

Referring to FIG. 14, it is noted that an uplink component carrier 2 1410 is removed. The user equipment determines whether an uplink component carrier linked with a downlink component carrier 2 1400 by the system information (SI) exists, wherein the downlink component carrier 2 1400 is linked with the removed uplink component carrier 2 1410. Then, the user equipment establishes a linkage of the downlink component carrier 2 1400 with an uplink component carrier 1 1420 which is a primary uplink component carrier The linkage suggested in the present invention may include a linkage for transmission and reception of feedback data, a linkage for power headroom reporting, and a linkage for synchronization control between the user equipment and the base station.

The user equipment may use the method for establishing a linkage as suggested in the present invention for transmission and reception of feedback data. For example, if an uplink component carrier is added regardless of a linkage with the existing downlink component carrier, the user equipment establishes a linkage between the existing downlink component carrier and the added uplink component carrier in accordance with the method for establishing a linkage as suggested in the present invention. If the user equipment receives data through the downlink component carrier linked with the added uplink component carrier, it transmits feedback data through the added uplink component carrier. The method for establishing a linkage may be applied to a case where the user equipment transmits to the base station advance information (for example, channel status information, precoding matrix index, rank indicator, scheduling request, and reference signal) transmitted before receiving data in addition to transmission of feedback data.

In addition, power headroom reporting means the difference between the power capacity that may be transmitted from the user equipment through a specific component carrier and the power capacity that has been already transmitted from the user equipment through the corresponding component carrier. The base station is reported a power headroom for the component carrier used by the user equipment from the user equipment and calculates a power capacity to be used by the user equipment when the user equipment transmits the corresponding component carrier. In this case, to calculate a power headroom for a specific uplink component carrier, the user equipment should measure path loss of the corresponding component carrier and reflect the measured path loss in calculation of the power headroom. Generally, path loss of the component carrier is calculated by measurement of the downlink component carrier linked with the uplink component carrier, which is intended to be transmitted from the user equipment, by the system information (SI). However, if the downlink component carrier linked with the uplink component carrier by the system information (SI) is not configured, the user equipment establishes the linkage between the uplink component carrier and the primary downlink component carrier in accordance with the embodiment of the present invention and calculates the power headroom of the uplink component carrier by measuring path loss of the primary downlink component carrier on the basis of the configured linkage.

Also, the present invention may be used for the procedure of maintaining time synchronization between the user equipment and the base station. In order to maintain normal synchronization between the user equipment and the base station by transmitting data from the user equipment through a specific uplink at normal timing, the base station commands the user equipment to finely control uplink transmission timing. This command will be referred to as timing advance (TA) in the LTE system. Uplink transmission timing of the user equipment may become slow or fast a little through timing advance. The user equipment configures uplink transmission timing by applying a TA value received based on timing of the used downlink carrier in the form of offset. However, if the downlink component carrier, which is the reference for transmission of the specific uplink component carrier, is not designated, the user equipment according to the present invention establishes a linkage for time synchronization with the downlink component carrier linked with the uplink component carrier by the system information (SI). If the downlink component carrier linked with the uplink component carrier by the system information (SI) does not exist, the user equipment autonomously establishes a linkage between the uplink component carrier and its primary downlink component carrier.

Finally, the present invention may be applied to a linkage for a random access procedure of the user equipment. After transmitting a random access preamble on a specific uplink component carrier, the user equipment may select a downlink linked with the uplink component carrier by the system information (SI) as a downlink component carrier which expects reception of a random access response transmitted from the base station in response to the random access preamble. If the downlink component carrier linked with the uplink component carrier by the system information (SI) does not exist, the user equipment expects reception of the random access response as the primary downlink component carrier.

As described above, the linkage between the component carriers according to the present invention may respectively be established per function performed by the user equipment, and the linkage between different component carriers may be established per function.

Figure 15:
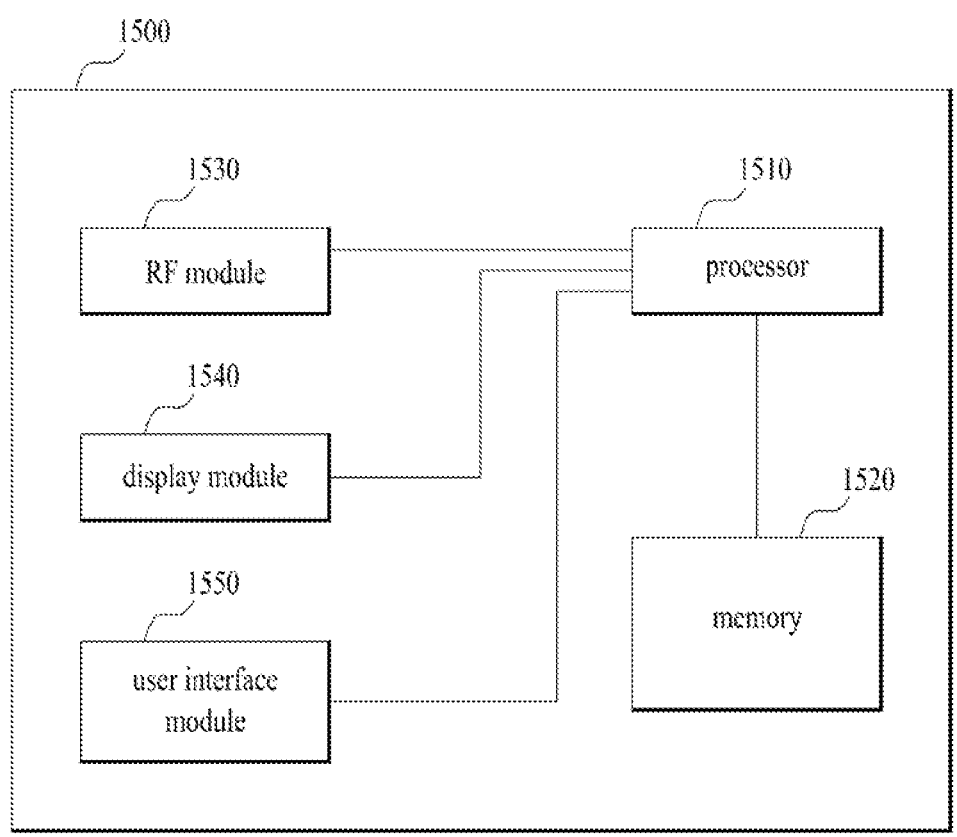
FIG. 15 is a block diagram illustrating a communication apparatus according to the embodiment of the present invention.

FIG. 15 is a block diagram illustrating a communication apparatus according to one embodiment of the present invention.

Referring to FIG. 15, the communication apparatus 1500 includes a processor 1510, a memory 1520, a radio frequency (RF) module 1530, a display module 1540, and a user interface module 1550.

The communication apparatus 1500 is illustrated for convenience of description, and some of its modules may be omitted. Also, the communication apparatus 1500 may further include necessary modules. Moreover, some modules of the communication apparatus 1500 may be divided into segmented modules. The processor 1510 is configured to perform the operation according to the embodiment of the present invention illustrated with reference to the drawings. In more detail, a detailed operation of the processor 1510 will be understood with reference to the disclosure described with reference to FIG. 1 to FIG. 14.

The memory 1520 is connected with the processor 1510 and stores an operating system, an application, a program code, and data therein. The RF module 1530 is connected with the processor 1510 and converts a baseband signal to a radio signal or vice versa. To this end, the RF module 1530 performs analog conversion, amplification, filtering and frequency uplink conversion, or their reverse processes. The display module 1540 is connected with the processor 1510 and displays various kinds of information. Examples of the display module 1540 include, but not limited to, a liquid crystal display (LCD), a light emitting diode (LED), and an organic light emitting diode (OLED). The user interface module 1550 is connected with the processor 1510, and may be configured by combination of well known user interfaces such as keypad and touch screen.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point.

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the method for establishing component carriers through a user equipment in a wireless communication system and the apparatus for the same have been described based on the 3GPP LTE system, they may be applied to various wireless communication systems in addition to the 3GPP LTE system.

The invention claimed is:

1. A method for configuring component carriers in a wireless communication system, the method comprising:
    transmitting, by a user equipment, a random access preamble to a base station through a first component carrier, the first component carrier being an uplink component carrier;
    when a component carrier linked with the first component carrier is removed, determining, by the user equipment, whether or not a second component carrier, which is linked with the first component carrier by means of system information, exists;
    if the second component carrier exists,
        establishing, by the user equipment, a linkage between the second component carrier and the first component carrier; and
        receiving, by the user equipment, a random access response from the base station through the second component carrier; and
    if the second component carrier does not exist,
        establishing, by the user equipment, a linkage between a primary component carrier and the first component carrier; and
        receiving, by the user equipment, a random access response from the base station through the primary component carrier.

2. The method according to claim 1, further comprising the steps of:
    receiving data from the base station through the second component carrier or the primary component carrier; and
    transmitting feedback data of the data to the base station through the first component carrier.

3. The method according to claim 1, further comprising:
    calculating path loss of a signal received from the base station through the second component carrier or the primary component carrier; and
    configuring power headroom reporting corresponding to the first component carrier based on the path loss.

4. The method according to claim 1, further comprising:
    receiving an uplink transmission timing offset value of the first component carrier from the base station through the second component carrier or the primary component carrier.

5. An apparatus for configuring component carriers in a wireless communication system, comprising:
    a radio frequency (RF) unit; and
    a controller operatively connected to the RF unit and configured to:
        transmit a random access preamble to a base station through a first component carrier, the first component carrier being an uplink component carrier;
        when a component carrier linked with the first component carrier is removed, determine whether or not a second component carrier, which is linked with the first component carrier by means of system information, exists;
        if the second component carrier exists,
            establish a linkage between the second component carrier and the first component carrier; and
            receive a random access response from the base station through the second component carrier; and
        if the second component carrier does not exist,
            establish a linkage between a primary component carrier and the first component carrier; and
            receive a random access response from the base station through the primary component carrier.

* * * * *